354-403 SR
1/13/87 OR 4,636,053

United States Patent [19]

Sakane et al.

[11] Patent Number: 4,636,053

[45] Date of Patent: Jan. 13, 1987

[54] DISTANCE DETECTING DEVICE

[75] Inventors: Toshio Sakane; Tetsuya Taguchi, both of Kanagawa; Masahiko Ogawa, Tokyo; Shuichi Tamura; Tokuichi Tsunekawa, Yokohama, all of Japan

[73] Assignee: Canon Kabushiki Kaisha

[21] Appl. No.: 138,316

[22] Filed: Apr. 8, 1980

Related U.S. Application Data

[62] Division of Ser. No. 13,294, Feb. 21, 1979, Pat. No. 4,291,223.

[30] Foreign Application Priority Data

Feb. 24, 1978 [JP] Japan ..... 53-20659
Jul. 25, 1978 [JP] Japan ..... 53-90585

[51] Int. Cl.[4] ..... G03B 3/00; G03B 1/34; H01J 40/14

[52] U.S. Cl. ..... 354/403; 330/109; 250/214 A; 250/214 C; 250/339; 307/543; 307/553; 307/562; 328/2; 328/138; 328/167; 328/209

[58] Field of Search ..... 354/403; 330/109; 250/214 A, 339, 214 C, 241, 201; 307/543, 553, 561; 328/2, 151, 127, 138, 167, 209; 356/1

[56] References Cited

U.S. PATENT DOCUMENTS

| | | | |
|---|---|---|---|
| 3,047,808 | 7/1962 | Gray | 328/127 |
| 3,599,552 | 8/1971 | Harvey | 354/25 |
| 3,820,129 | 6/1974 | Hosoe et al. | 354/25 A |
| 3,828,173 | 8/1974 | Knepler | 250/341 |
| 3,873,827 | 3/1975 | Kraus | 250/201 |
| 4,123,650 | 10/1978 | Hosoe et al. | 354/25 |
| 4,151,477 | 4/1979 | Yokoyama | 350/107 |
| 4,178,098 | 12/1979 | Asano et al. | 250/201 X |

FOREIGN PATENT DOCUMENTS

| | | | |
|---|---|---|---|
| 525603 | 8/1940 | United Kingdom | 333/172 |
| 533876 | 2/1941 | United Kingdom . | |
| 908030 | 10/1962 | United Kingdom . | |
| 1270596 | 4/1972 | United Kingdom . | |
| 1270597 | 4/1972 | United Kingdom . | |
| 1325439 | 8/1973 | United Kingdom . | |
| 1374695 | 11/1974 | United Kingdom . | |

*Primary Examiner*—William B. Perkey
*Attorney, Agent, or Firm*—Toren, McGeady, Stanger, Goldberg & Kiel

[57] ABSTRACT

A distance detecting device comprising radiation projecting means for projecting a radiation beam; radiation sensing means which is disposed away from the radiation projecting means with a given length and is arranged to receive a reflected radiation beam coming from an object whose distance is to be detected as the radiation beam is projected from the projecting means; and movable means for relatively varying the incident condition of the projected radiation beam onto the sensing means. The distance to the object is found either by the position of the movable means or by the amount of displacement thereof which occurs at a time point at which the sensing means optimally receive the reflected radiation beam coming from the object in the process of relatively varying the incident condition of the projected radiation beam onto the sensing means. In the incident condition varying process, the output signal of the sensing means and a delayed signal which is obtained by delaying the output signal a predetermined period of time are compared with each other to detect a time point at which the output signal of the sensing means has reached its peak level and, accordingly, to detect when the sensing means optimally recieve the reflected radiation beam coming from the object.

13 Claims, 11 Drawing Figures

F I G.5
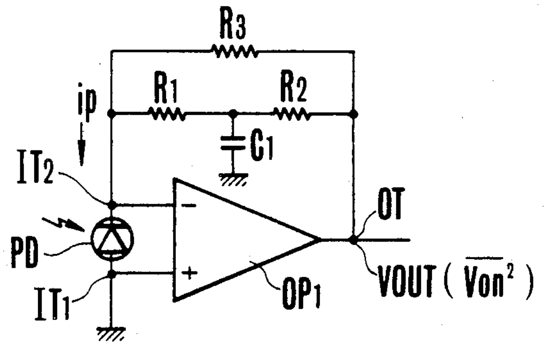
F I G.8
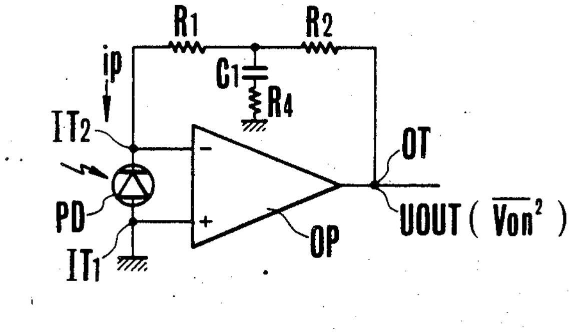

DISTANCE DETECTING DEVICE

BACKGROUND OF THE INVENTION

1. Field of the Invention

This invention relates to a distance detecting device for detecting a distance between an object and the device by projecting a radiation beam coming from the device and by receiving a reflected radiation beam coming from the object as the radiation beam is projected on and reflected by the object.

2. Description of the Prior Art

A variety of distance detecting devices of the above stated kind have been known. Typical examples of such distance detecting devices of prior arts include a device disclosed, for example, by U.S. Pat. No. 3,435,744 or U.S. Pat. No. 3,442,193. The disclosed device is provided with radiation beam projecting means, i.e. a light source such as a lamp, for projecting a radiation beam toward an object whose distance is to be detected and radiation sensing means, such as photocell means, which is disposed away from the projecting means with a given length and is arranged to receive a reflected radiation beam coming from the object as the radiation beam is projected onto and reflected by the object. Under the condition that the radiation beam is projected from the projecting means, the radiation beam receiving axis or direction of the radiation sensing means or both, the radiation beam receiving axis or direction of the sensing means and the radiation beam projecting axis or direction of the projecting means are changed or swept relative to the object by sweep means from a predetermined angular position to a predetermined direction. During the sweeping or changing of said axis or direction in this manner, when the sensing means comes to receive the reflected radiation beam which is reflected by and coming from the object after the radiation beam has been projected from the projecting means, the sweeping operation of the sweep means is stopped. Then, the distance between the object and the device is detected from the position or an angular position of the sweep means or from the amount of its displacement from said predetermined position. This distance detecting device is included in an automatic focusing system of a photographic camera disclosed by U.S. Pat. No. 3,435,744. Another U.S. Pat. No. 3,443,502 discloses also an automatic focusing system for cameras including a distance detecting means in which: Under the condition that a radiation beam is being projected from projecting means in a manner similar to the arrangement of the above stated prior art, sweep means is arranged to change or sweep the radiation beam projecting axis or direction of the projecting means relative to an object whose distance is to be detected into a predetermined direction from a predetermined angular position. Then, in the same manner as in the above stated prior art example, the sweeping operation of the sweep means is stopped, when sensing means comes to receive a reflected radiation beam coming from the object, and thus the distance between the object and the device is found from the position or angular position of the sweep means or from the amount of its displacement from said predetermined position.

Each of the devices of the prior arts is arranged to detect the distance of an object by sweeping the radiation beam projecting axis or direction of the projecting means and/or the radiation beam receiving axis or direction of the sensing means relative to the object whose distance is to be detected and then by finding a point of time at which the sensing means comes to receive the reflected radiation beam coming from the object. It is therefore, most important for improvement in the accuracy of distance detecting operation to accurately detect a point of time at which the sensing means comes to receive the reflected radiation beam coming from the object. Generally, however, the radiation receiving surface area of the sensing means is limited. On the other hand, it is inevitable that the radiation beam projected from the projecting means, though narrowly throttled it may be, is more or less irregularly reflected by the object. Considering these facts, in order to detect the point of time at which the sensing means optimally receive the reflected radiation beam coming from the object during the above stated process of sweeping, there is no conceivable way other than a method of detecting the point of time at which the output of the sensing means reaches its peak level. For a practical application of such a device, therefore, a key to improve the distance detecting accuracy is to accurately detect that the output of the sensing means has reached its peak level. Generally, however, this is very difficult. In one conceivable method, for example, the output of the sensing means is supplied to a known peak hold circuit and, the level of the output of this peak hold circuit and that of the output of the sensing means are compared by a comparison circuit, during the above stated sweeping process, to detect a point of time at which a condition where the output level of the peak hold circuit is equal to that of the sensing means changes to a condition where the output level of the peak hold circuit is higher than that of the sensing means, so that the arrival of the peak level of the output of the sensing means can be detected thereby. In other words, this method is based on the concept that: The output of the sensing means and the output of the peak hold circuit have equal levels until the former reaches its peak level during the above stated sweeping process, and that after the output of the sensing means has reached the peak level, the output level of the sensing means gradually lowers from the peak level while the level of the output of the peak hold circuit continues to retain the peak level of the output of the sensing means. Therefore, when the output of the sensing means passes the peak level thereof, there obtains the relation of "the output level of the sensing means < the output level of the peak hold circuit (=peak level)". Therefore, it is possible to detect a point of time at which the output of the sensing means has reached its peak level by detecting a point of time at which the output level of the sensing means becomes lower than that of the peak hold circuit. However, there is a fatal drawback in this method. The output level of the sensing means might be lowered as a whole due to decrease in the intensity of the reflected radiation beam incident upon the sensing means. In such a case, it becomes hardly possible to accurately detect the peak level. Besides, most of the distance detecting devices of this type are to be used for automatic focusing in a compact photographic camera. Such a compact photographic camera in general has a limited power source capacity. Therefore, the intensity of the radiation beam to be projected from the projecting means is naturally limited. In addition to this problem, objects to be photographed in most cases irregularly reflect radiation beams. The above stated drawback of the method, therefore, is very serious and the use of it for automatic focusing in a photographic camera hardly ensures unvaryingly satisfactory performance.

SUMMARY OF THE INVENTION

The present invention is directed to the solution of the above mentioned problems of the conventional distance detecting devices.

It is therefore a principal object of this invention to provide a distance detecting device which is capable of performing distance detection with improved detection sensitivity and with unvarying accuracy in despite of an adverse condition such as a decrease in intensity of a radiation beam, as the device comprising: Radiation beam projecting means which projects a radiation beam; radiation sensing means which is disposed away from the projecting means with a given length and is arranged to receive a reflected radiation beam coming from an object whose distance is to be detected as the radiation beam is projected thereby; and movable means which is arranged to relatively vary the incident condition of the reflected radiation beam upon the sensing means and in which during the process of relatively varying the incident condition of the reflected radiation beam onto the sensing means, the distance between the object and the device is detected on the basis of the position of the movable means or the amount of displacement thereof from a predetermined position at the time when the sensing means comes to best receive the reflected radiation beam coming from the object.

It is another object of the present invention to provide an excellent and novel method by which it is possible to detect with a higher degree of accuracy when the sensing means optimally receives the reflected radiation during the process of continuous and relative changes in the incidence of the reflected radiation beam to the sensing means.

It is still another object of this invention to provide an excellent and novel method for performing highly accurate distance detection and especially a method of detecting a point of time at which the output of the sensing means has reached its peak level to thereby detect a point of time at which the reflected radiation beam is optimally received by the sensing means in the process of relatively varying the incident condition of the reflected radiation beam onto the above stated sensing means.

To attain these objects according to this invention, the distance detecting device is arranged to detect a point of time at which the output of the sensing means has reached its peak level by comparing an output signal of the sensing means which is produced in the process of relative variation of the incident condition of the reflected radiation beam from an object with a delayed signal which is obtained by delaying this output signal by a predetermined length of time. With this arrangement, the point of time when the reflected radiation beam coming from the object is optimally received by the sensing means during the process of relatively varying the incident condition of the reflected radiation beam onto the sensing means is detected in an advantageous manner. In accordance with this method of peak detection, the peak detection can be always accurately performed even when the output level of the sensing means is lowered by a decrease in the intensity of the radiation beam incident upon the sensing means, so that distance detection can be always accurately performed in despite of such an adverse condition.

According to this invention, there are provided delay means which receives the output of the sensing means and delays it by a predetermined length of time and coincidence detecting means which receives both a delayed signal from the delay means and an output signal from the sensing means. During the process of the relative variation, effected by the movable means of the incident condition of the reflected radiation beam onto the sensing means, the coincidence detecting means detects a point of time at which the output signal of the sensing means coincides with the delayed signal of the delay means. Then, the output of the sensing means is judged to have reached its peak level at a point of time that precedes the point of time at which the coincidence is detected as much as a length of time virtually corresponding to $\frac{1}{2}$ of the length of time delayed by the delay means. In this case, the time difference between the point of time at which the coincidence of the two signals is detected by the coincidence detecting means and a point of time at which the output of the sensing means actually reaches its peak level is evidently dependent only on the length of time delayed by the delay means and remains unaffected by variation in the object distance. Accordingly, if, for example, the movable means which relatively varies the incident condition of the reflected radiation beam onto the sensing means is arranged to be stopped at the point of time at which the coincidence of the two signals is detected by the coincidence detecting means, and it is so arranged that the object distance is indicated according to the position or the amount of displacement of the movable means at that point of time, the detected distance of the object can be always accurately indicated mechanically by the amount of displacement of the movable means beforehand as much as the above stated time difference, which corresponds to about $\frac{1}{2}$ of the length of time delayed by the delay means.

With this arrangement of the distance detecting device of the present invention, when it is used for automatic focusing of a photograph taking lens in a compact photographic camera in most cases, for photographing an irregularly reflecting object and in which the intensity of radiation beam to be projected is naturally restricted by a severely limited capacity of its power source, the camera is assured of reliable performance of focus adjustment. It is particularly advantageous to have the degree of adjustment of the photograph taking lens mechanically corrected beforehand as much as a degree that corresponds to about $\frac{1}{2}$ of the delay time to be effected by the delay means. With such arrangement, focusing adjustment can be carried out with high precision.

It is a further object of this invention to provide, in addition to other objects, a pre-amplifier which receives the output signal of the above stated sensing means with improved performance characteristics, so that the detection sensitivity of the whole distance detecting device can be enhanced thereby.

It is a still further object of this invention to provide an A.C. amplifier circuit having improved performance characteristics, especially, in cases where the projecting means projects a radiation beam which is amplitude modulated at several KHz to make the projected radiation beam clearly discernible from ambient radiations such as sun light, etc. The output of the sensing means produced in response to such ambient radiation is held to a minimum while the output of the sensing means produced in response to the radiation beam projected from the projecting means for distance detection is taken out to a greater degree through the arrangement of the A.C. amplifier circuit. In such circuit, there is provided a T-type low-pass filter circuit which is composed of resistors and a capacitor in a negative feedback route between the output terminal and the inversion input terminal of an operational amplifier which receives an output current of the sensing means. According to this invention, the performance characteristics of the A.C. amplifier circuit is improved to suppress a circuit noise to a minimal degree without causing any change in the frequency characteristic of the gain and to attain sufficient improvement in the S/N ratio of the whole amplifier circuit despite the provision of the T-type low-pass filter circuit in the negative feedback route of the operational amplifier. In a preferred embodiment of the invention, the A.C. amplifier circuit is arranged to have the resistance value of a resistor which is disposed on the inversion input side of the above stated operational amplifier in the T-type low-pass filter circuit as large as possible, i.e. to have the resistance value as large as possible within the range of not saturating the amplifier circuit. In accordance with this arrangement, as will be further described hereinafter as an embodiment, the noise of the circuit can be reduced to a very low degree while the frequency characteristic of the gain remains unchanged. With this arrangement, therefore, the detection sensitivity of the whole device can be further increased. In another embodiment of this invention, an additional resistor is arranged in series with the capacitor in the above stated T-type low-pass filter circuit. In this arrangement, a gain within a high frequency region higher than a predetermined frequency is restricted by this additional resistor, so that a high resistance value can be obtained for gain restriction in an ordinary T-type low-pass filter circuit. Accordingly, a feedback resistance that hinders the use of integrated circuits can be eliminated. This is a great advantage which allows for the use of integrated circuits.

These and other objects, advantages and features of the invention will become more apparent as the description proceeds, when considered together with the accompanying drawings.

BRIEF DESCRIPTION OF THE DRAWINGS

FIG. 3A shows a control circuit for the radiation beam projecting means thereof and FIG. 3B shows a detection circuit which detects the distance of an object on the basis of the output of a radiation beam sensing means.

FIG. 5 is a circuit diagram showing an A.C. amplifier circuit which receives the output of the radiation beam sensing means in the circuit shown in FIG. 3B.

FIG. 8 is a circuit diagram showing another example of the above stated A.C. amplifier circuit suitable for the circuit shown in FIG. 3B.

DETAILED DESCRIPTION OF THE PREFERRED EMBODIMENTS

Figure 1:
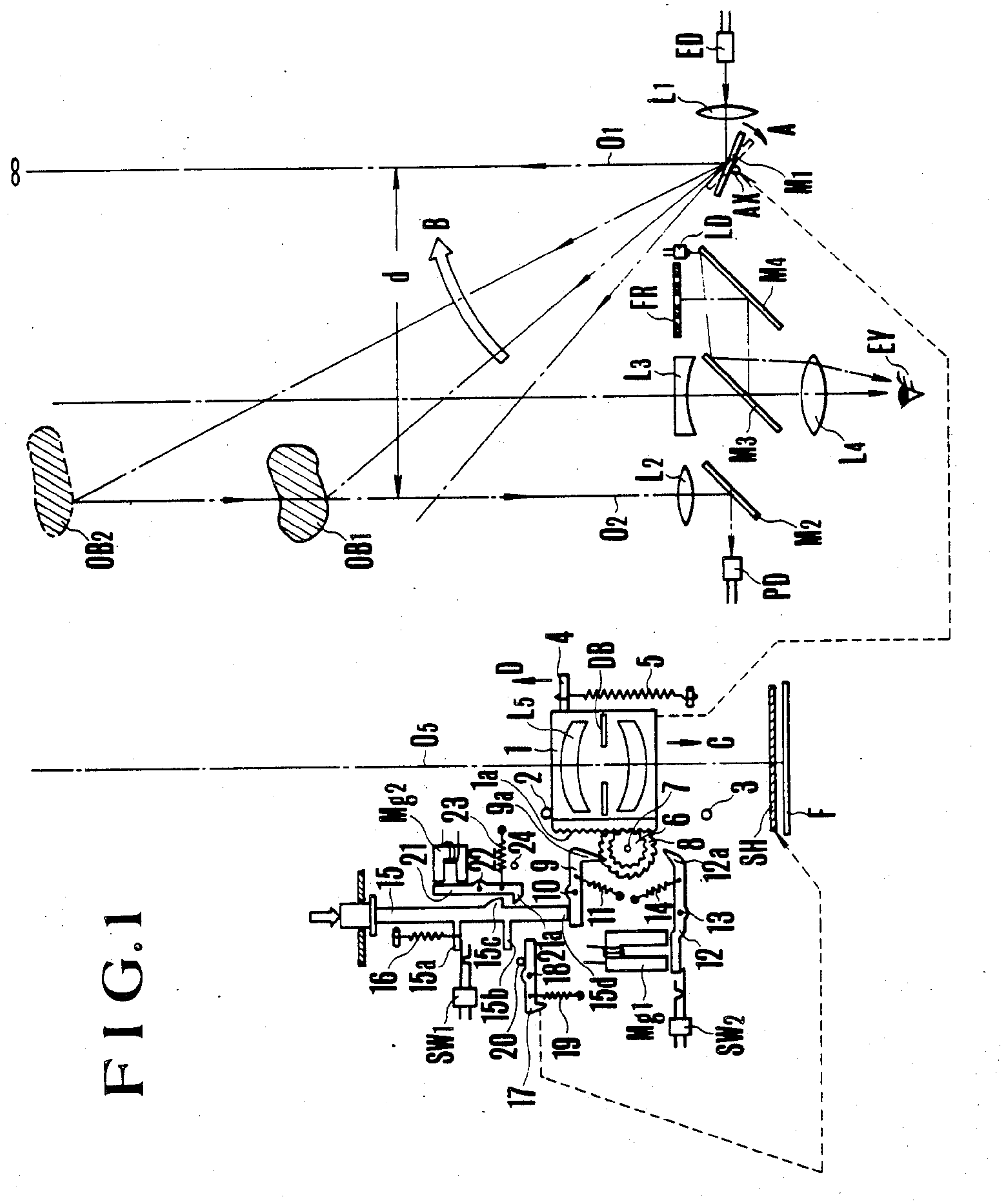
FIG. 1 is a schematic illustration showing an optical system and a main mechanism in an automatic focusing system of a camera with the distance detecting device of the invention incorporated therein as embodiment example.

Referring to the schematic illustration of structural arrangement of FIG. 1, a reference symbol ED indicates a light emitting element which is herein referred to as radiation beam projecting means. In this embodiment, this element is a light emitting diode that emits infrared rays or near infrared rays. A reference symbol L1 indicates a beam projecting lens disposed in front of the light emitting element ED. A rotating mirror M1 is disposed in front of the lens L1. The rotating mirror is herein referred to as beam sweep means and is arranged to rotate on an axis AX in the direction of arrow A shown in the drawing and in association with the movement of a photograph taking lens which will be described later herein. With the rotating mirror M1 rotating in the direction of arrow A, the mirror M1 causes a light beam, which is emitted by the light emitting element ED and is reflected by the mirror M1, to be swept toward an object to be photographed in the direction of arrow B shown in the drawing. A light receiving lens L2 is arranged to receive the light beam which is projected through the mirror M1 and then is reflected by the object. The light receiving optical axis O2 of the light receiving lens L2 is located away from the reflecting optical axis O1 of the mirror M1 as much as a given base line distance d with the mirror M1 in the position of 45 degrees which is indicated by a broken line in the drawing, i.e. when the light beam is projected toward an object located at an infinite distance. A total reflection mirror M2 is disposed behind the lens L2 fixedly and tilted at an angle of 45 degrees. A photosensitive element PD which is herein referred to as radiation sensing means is disposed in a position to receive the light beam reflected and coming through the mirror M2. In this embodiment, the photosensitive element PD is a photo-diode which is responsive to the infrared rays or near infrared rays which are emitted from the above stated light emitting element ED.

A symbol L3 indicates an objective lens provided for a view finder; M3 indicates a tilted half mirror; FR indicates a frame member which is arranged to display a photo-taking visual field and a distance measuring visual field within the view finder; M4 indicates a tilted total reflection mirror, and L4 indicates an eyepiece lens. A view finder optical system of a camera is composed of these parts. There is provided a display light emitting element LD, such as a light emitting diode, which is arranged to give a warning by remaining lighted during a period from the beginning of distance detection until the photograph taking lens is correctly adjusted to a position at which it is correctly focused on an object to be photographed. The display light emitting element LD is disposed in such a manner that its light is reflected by the mirrors M4 and M3 and reaches the eye EY of the photographer through the lens (eyepiece) L4.

A photograph taking lens L5 is carried by a lens barrel 1, which is slidable within a range defined by stopper pins 2 and 3 along the photograph taking optical axis of the lens L5 by guiding it with a guiding means which is not shown. The stopper pin 2 is arranged to stop the sliding movement of the lens barrel 1 in the direction of arrow D at a point which is further forward from a focusing position of the lens L5 for an object located at a nearest photographic distance as much as a distance corresponding to a degree of correction which will be described later. The stopping pin 3 is arranged to stop the sliding movement of the lens barrel 1 in the direction of arrow C at a point where the photograph taking lens L5 comes to be focused on an object located at an infinite distance. The lens barrel 1 is urged to move in the direction of arrow C by a spring 5 connected to a pin 4 provided on the outer circumference of the lens barrel 1. A symbol DB indicates a diaphragm; SH a shutter; and F a film. A pinion 6 is rotatably carried by a shaft 7 and is arranged to engage a rack 1*a* which is formed on the outer circumference of the lens barrel 1. A ratchet wheel 8 is arranged to rotate together with the pinion 6 while there is provided a first lock lever 9 which is arranged to lock the ratchet wheel by engaging therewith. The first lock lever 9 is provided with a claw part 9*a* which is engageable with the teeth of the ratchet wheel 8. A shaft 10 pivotally holds the lever 9 while a spring 11 is arranged to urge the lever 9 to rotate on the shaft 10 clockwise as viewed in the drawing, in the direction in which the claw part 9*a* comes to engage the teeth of the ratchet wheel 8. There is provided a second lock lever 12 which is arranged to lock the ratchet wheel 8 by coming into engagement therewith. The second lock lever 12 is provided with a claw part 12*a* which is engageable with the teeth of the ratchet wheel 8. The lever 12 is pivotally carried by a shaft 13 to be freely rotatable thereon. A spring 14 is arranged to urge the second lock lever 12 to rotate on the shaft 13 counterclockwise as viewed in the drawing, i.e. in the direction in which the claw part 12*a* comes into engagement with the teeth of the ratchet wheel 8. There is provided an electromagnet Mg1 for controlling the locking action of the second lock lever 12. The electromagnet Mg1 is controlled by a control circuit which will be described later herein. A light emission stopping switch SW2 is arranged to stop the light emitting action of the light emitting element ED, the switch SW2 being of a normal close type. When the electromagnet Mg1 is deenergized to cause the second lock lever 12 to lock the ratchet wheel 8, this normal close type switch SW2 is arranged to be opened by a tail end of the second lock lever 12. A reference numeral 15 indicates a release rod which is provided for a releasing operation of the camera; 16 indicates a spring which is arranged to return the rod 15 back to its position and is connected to a first arm 15*a* of the rod 15. In the first stage of a depressing operation on the release rod 15, the first arm 15*a* closes a normal open type power source switch SW1 provided in an electrical circuit which will be described later herein. After the switch SW1 is closed during the depression of the release rod 15, the fore end 15*d* of the release rod 15 comes to push the tail end of the first lock lever 9 to cause the lever 9 to rotate counterclockwise against the force of the spring 11. A numeral 17 indicates a locking member which is arranged to lock the shutter SH in its state of being charged. During the above stated depressing operation on the release rod 15, the first step stroke of the release rod depressing operation causes the switch SW1 to be closed and the first lock lever 9 to unlock the ratchet wheel 8 as mentioned in the foregoing. Then, in the second step stroke of the release rod depressing operation, the tail end of the locking member 17 is pushed. This causes the locking member 17 to rotate clockwise on a shaft 18 against the force of a spring 19 to release the shutter SH from its state of being locked. A numeral 20 indicates a stopper pin which is arranged to stop the rotation of the locking member 17. In the release rod depressing operation, shutter release is inhibited by a release lock member 21 as it engages with a protrusion 15*c* of the release rod 15 between the first step stroke which closes the switch SW1 and release the first lock lever 9 and the second step stroke of the operation which releases the shutter SH. The release lock member 21 is provided with a claw part 21*a* which is engageable with the protrusion 15*c* of the release rod 15. The release lock member 21 is pivotally carried by a shaft 22 to be freely rotatable on the shaft 22 while a spring 23 is arranged to urge it to rotate counterclockwise on the shaft 22, i.e. in the direction of having the claw part 21*a* retracted from the path of the protrusion 15*c*. A numeral 24 indicates a stopper pin provided for the release lock member 21. There is provided an electromagnet Mg2 which is arranged to control the action of the release lock member 21. The electromagnet Mg2 is under the control of a control circuit (which will be described later) together with the other electromagnet Mg1.

In the above described structural arrangement, the lens barrel 1 can be reset against the force of the spring 5 into a position defined by a stopper pin 2 through a suitable means such as a reset mechanism interlocked with a film winding and shutter charging mechanism which is not shown or through a reset mechanism that is manually operable independently of other mechanisms. In this particular embodiment example, however, the lens barrel 1 is illustrated as resettable, for example, by manually moving the pin 4 in the direction of arrow D. The above stated rotating mirror M1 which is herein referred to as "sweeping means" is operatively interrelated, through a suitable interlocking mechanism as conceptionally represented by an arrow and a chain line, with the lens barrel 1 such that each change in the projection distance position of a projected light beam due to the rotation of the mirror M1 in the direction of arrow A (i.e. sweeping in the direction of arrow B) is made ahead of each adjusted distance position of the lens L5 as much as a degree corresponding to about ½ of the length of time delayed by a signal produced by a delay circuit, which will be described later, when the lens barrel 1 is moved in the direction of arrow C. For example, when the lens barrel 1 is in the reset position defined by the stopper pin 2, a light beam to be reflected by the rotating mirror M1 is in an angular position (an angular position shown by a full line in the drawing) in which the light beam is projected on an object which is located closer than the distance on which the lens L5 is then focused. Further, when the lens barrel 1 is brought into a position defined by its abutment on the stopper pin 3 (i.e. a position where the photograph taking lens L5 is focused on an object located at an infinite distance), the mirror M1 is so adjusted beforehand that the mirror is rotated in the direction of arrow A to assume an angular position which is by a slight degree beyond the 45 degree angular position shown by a broken line in the drawing and in which the light beam is projected on the object located at the infinite distance.

Figure 2:
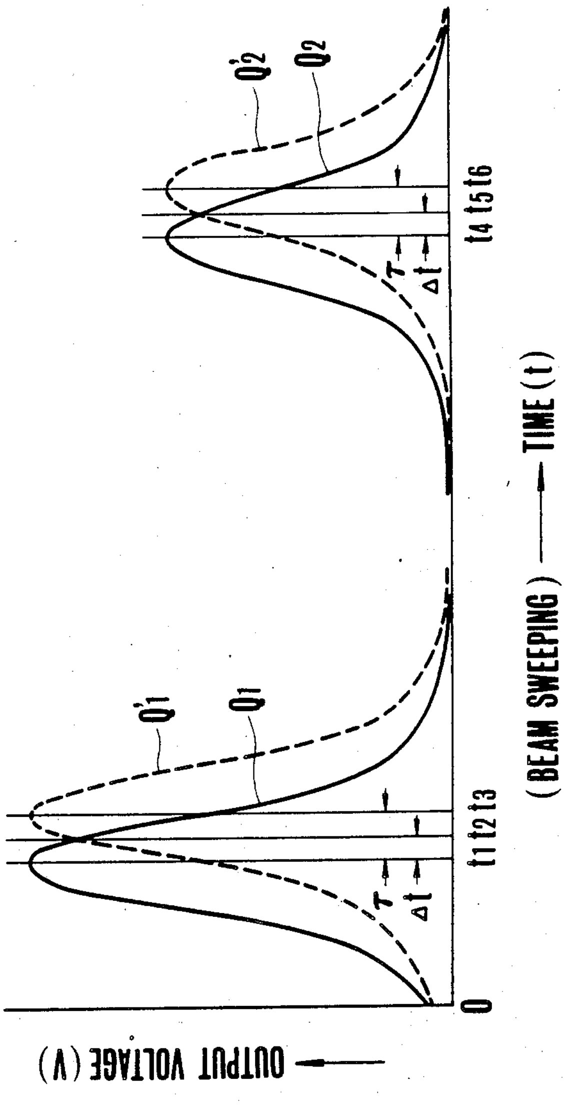
FIG. 2 is an illustration of signal wave form illustrating the distance detecting method employed in the distance detecting device shown in FIG. 1.

The distance detecting operation of the above described distance detecting device of the present invention employed in an automatic focusing system of a camera will be understood from the following description with reference to FIG. 2.

Generally, in a distance detecting device of the structural arrangement such as the one described in the foregoing, since the reflected light beam incident upon the photo sensitive element PD will to have the strongest intensity thereof at a point of time at which the projected light beam correctly impinges upon an object to be photographed during the sweeping process of the light beam in the direction of arrow B caused by the rotation of the rotating mirror M1 in the direction of arrow A, the output of the photo sensitive element PD reaches its peak level at the point of time. Accordingly, with the output of the photo sensitive element PD detected in the sweeping process of the light beam, if the rotation of the mirror M1 is immediately stopped at the point of time at which the output reaches its peak level, the distance to the object to be photographed can be indicated by the rotating angular position of the mirror M1 at that time. In the present invention, the peak level of the output of the photo sensitive element PD is detected in the following manner: The light receiving angle of the photo sensitive element PD is restricted by the lens L2 within a very slight range of angle having the optical axis O2 of the lens L2 in the middle of the range. The light beam which is projected from the light emitting element ED through the lens L1 and mirror M1 is throttled by the lens L1 into a relatively narrow beam. Thus the rotation of the mirror M1 causes a light spot of a relatively small area to sweep the object to be photographed. Under this condition, when the object to be photographed is located at a relatively short distance as indicated by OB1 in FIG. 1, the photosensitive element PD produces, during the sweeping process of the light beam, a signal of a wave form as indicated by Q1 in FIG. 2. If the object is located at a relatively long distance as indicated by OB2 in FIG. 1, the photosensitive element PD produces a signal of a wave form as represented by Q2. Then, assuming that the output signal of the photosensitive element PD is supplied to a delay circuit having a delay time $\tau$, the delay circuit produces a delayed signal Q1' for the output signal Q1 as shown in FIG. 2 and a delayed signal Q2' for the output signal Q2 as also shown in FIG. 2. Assuming that the time at which the output signal Q1 reaches its peak level is t1 and the time at which the output signal Q2 reaches its peak level is t4, the time t3 at which the delayed signal Q1' for the output signal Q1 reaches its peak can be expressed by $t3=t1+\tau$. In the same manner, the time t6 at which the delayed signal Q2' for the output signal Q2 reaches its peak can be expressed by $t6=t4+\tau$. On the other hand, if the output signal Q1 or Q2 of the photosensitive element PD and the delayed signal Q1' or Q2' are supplied to a coincidence detecting circuit to detect a point of time at which the two signals come to coincide with each other, i.e. a point where the two cross each other, the coincidence detecting circuit produces a signal representing the coincidence of the two signals at a point of time t2 for the output signal Q1 and the delayed signal Q1' and at another point of time t5 for the output signal Q2 and the delayed signal Q2'. Further, assuming that each of the output signals Q1 and Q2 has a symmetrical wave form across the point of time t1 or t4, a time difference t2−t1 between the peak reaching time t1 of the output signal Q1 and the crossing time t2 of the output signal Q1 and the delayed signal Q1' is equal to a time difference t5−t4 between the peak reaching time t4 of the output signal Q2 and the crossing time t5 of the output signal Q2 and the delayed signal Q2'. This can be expressed by $t2-t1=t5-t4=\Delta t$. Then, assuming that the time difference $\Delta t$ is dependent on the signal delaying time $\tau$ of the above stated delay circuit and that the output signal of the photosensitive element PD has a symmetrical wave form across the point of time at which it reaches its peak, the time difference can be expressed by $\Delta t=\frac{1}{2}\tau$. Accordingly, it can be judged that the output of the photosensitive element PD has reached its peak at a point of time which precedes, by a given length of time $\Delta t$, the point of time at which the coincidence between the output signal of the photosensitive element PD and the delayed signal of the delay circuit is detected by the above stated coincidence detecting circuit. This method is thus characterized by the detection of a crossing point between two signals which have a given time difference between them and which have wave forms congruent with each other. Therefore, even when the intensity of the light beam incident onto the photosensitive element PD decreases as a whole and thus causes a salient drop in the output level of the photosensitive element PD as a whole, the peak of the output of the photosensitive element PD can be always sensitively and accurately detected. Then, by utilizing the output of the coincidence detecting circuit, rotation of the mirror M1 is stopped when the coincidence of the two signals is detected. The distance is then read out from the rotation angular position of the mirror M1 which is corrected by a degree as much as the above stated time difference $\Delta t$. The distance to an object to be photographed can be always found with high accuracy in this manner. Further, as mentioned in the foregoing, the operative relation of the rotating mirror M1 to the lens barrel 1 is adjusted beforehand in such a manner that, when the lens barrel 1 is moved in the direction of arrow C in the structural arrangement of a camera as shown in FIG. 1, the variation in the projecting distance position of a projected light beam (or sweeping in the direction of arrow B) is arranged to precede each adjusted distance position of the photograph taking lens L5 as much as a degree corresponding to the above stated time difference $\Delta t$. The adjustment of the photograph taking lens L5 for focusing it on an object to be photographed can be alway very accurately carried out thus by stopping the lens barrel 1 immediately at the point of time at which the above staged coincidence is detected.

An automatic focusing camera which has the above described structural arrangement operates in the following manner: When the lens barrel 1 is in a state of having been reset into the illustrated position, which is defined by the stopper pin 2, by operating the pin 4, the spring 11 causes the first lock lever 9 to lock the ratchet wheel 8 and thus the lens barrel is locked in its reset position. Accordingly, the rotating mirror M1 is held in the angular position which is shown by a full line in the drawing. Further, when the power source switch SW1 is not closed and no power is supplied to circuits, both the electromagnets Mg1 and Mg2 are in a deenergized state. Therefore, the second lock lever 12 has been caused by the spring 14 to rotate counterclockwise into a state of locking the ratchet wheel 8 together with the first lock lever 9. The light emission stopping switch SW2 is then in a state of having been opened by the tail end of the second lock lever 12. On the other hand, the release lock member 21 is in a state of having been caused by the spring 23 to rotate counterclockwise until restricted by the stopper pin 24 and thus having its claw part 21*a* retracted from the path of the protrusion 15*c* of the release rod 15. Under this condition, the photographer peeps into the view finder and directs the camera to an object to be photographed. When the release rod 15 is depressed, the power source switch SW1 is closed by the first arm 15*a* of the rod 15 in the first place. Circuits are rendered operative by this. The control circuit then causes the electromagnets MG1 and Mg2 to be energized. This in turn causes the second lock lever 12 to rotate clockwise against the force of the spring 14 thus releasing the ratchet wheel 8 from its state of being locked by the second lock member 12 and thus leaving the ratched wheel in a state of being locked by the first lock member 9 only. Then, the swith SW2 is closed; and the light emitting element ED emits light to project a light beam through the lens L1 and the mirror M1. Meanwhile, the release lock member 21 is caused to rotate counterclockwise against the force of the spring 23. Accordingly, the claw part 21*a* of the release lock member 21 comes into the path of the protrusion of the release rod 15 to restrict the depression of the release rod 15 to the first step stroke. This condition is as represented by FIG. 1. When the switch SW1 is closed and the circuits are rendered operative thereby, the display element LD is lighted up to display a warning within the view finder that the focusing adjustment of the photograph taking lens 5 has not been completed. Under this condition, when the release rod 15 is further depressed until its protrusion 15*c* is locked by the release lock member 21 which thus inhibits further depression, the fore end 15*d* of the rod 15 pushes the tail end of the first lock lever 9 to cause it to rotate counterclockwise against the force of the spring 11. The ratchet wheel 8 is unlocked thereby and then the spring 5 causes the lens barrel 1 to begin its sliding movement in the direction of arrow C. Then, in response to this, the rotating mirror M1 begins to rotate in the direction of arrow A. Accordingly, the light beam comes to make its sweeping movement for the object in the direction of arrow B. When the distance to the object to be photographed is detected on the basis of the output of the photosensitive element PD during the sweeping process of the light beam as described in the foregoing, both the elecromagnets Mg1 and Mg2 are deenergized through the action of the control circuit. Therefore, the spring 14 will cause the second lock lever 12 to lock the ratchet wheel 8 and the photograph taking lens L5 is immediately stopped by this. Concurrently with this, the light emission stopping switch SW2 is opened to stop light emission by the light emitting element ED. Meanwhile, the spring 23 causes the release lock member 21 to rotate counterclockwise. Accordingly, the release lock is released and the release rod 15 becomes further depressible to its second step stroke. At this time, the display element LD is put off to end the warning condition. When the release rod 15 is further depressed with the display element having been put off, in the second step stroke of the depression, the second arm 15*b* of the release rod 15 causes the locking member 17 to rotate clockwise against the force of the spring 19. By this, the shutter SH is released and photographing is performed.

Figure 3A:
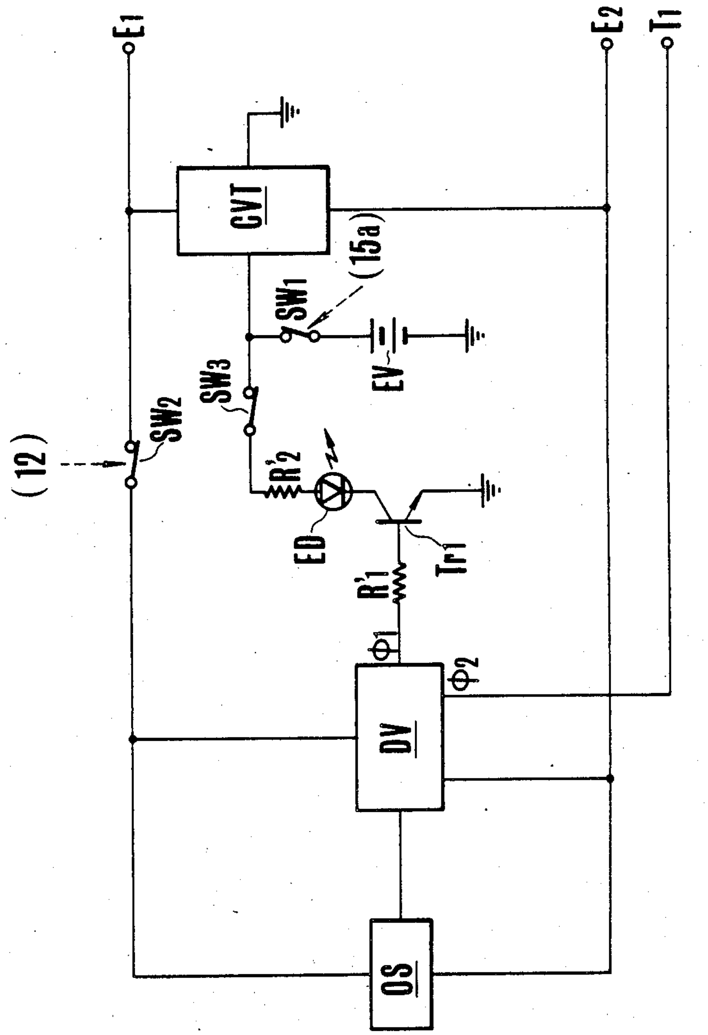
FIGS. 3A and 3B are circuit diagrams showing in combination with each other the electrical circuitry of the device shown in FIG. 1.
Figure 3B:
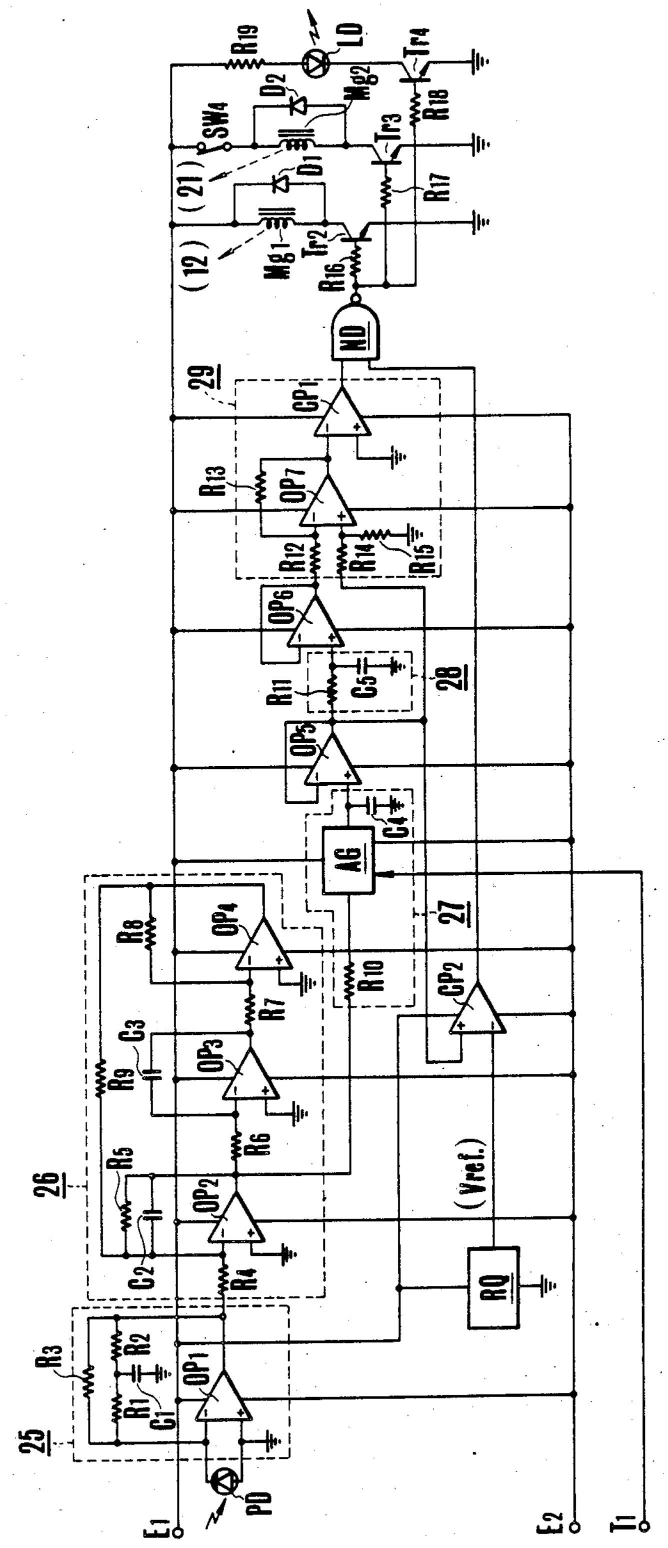
Figure 4:
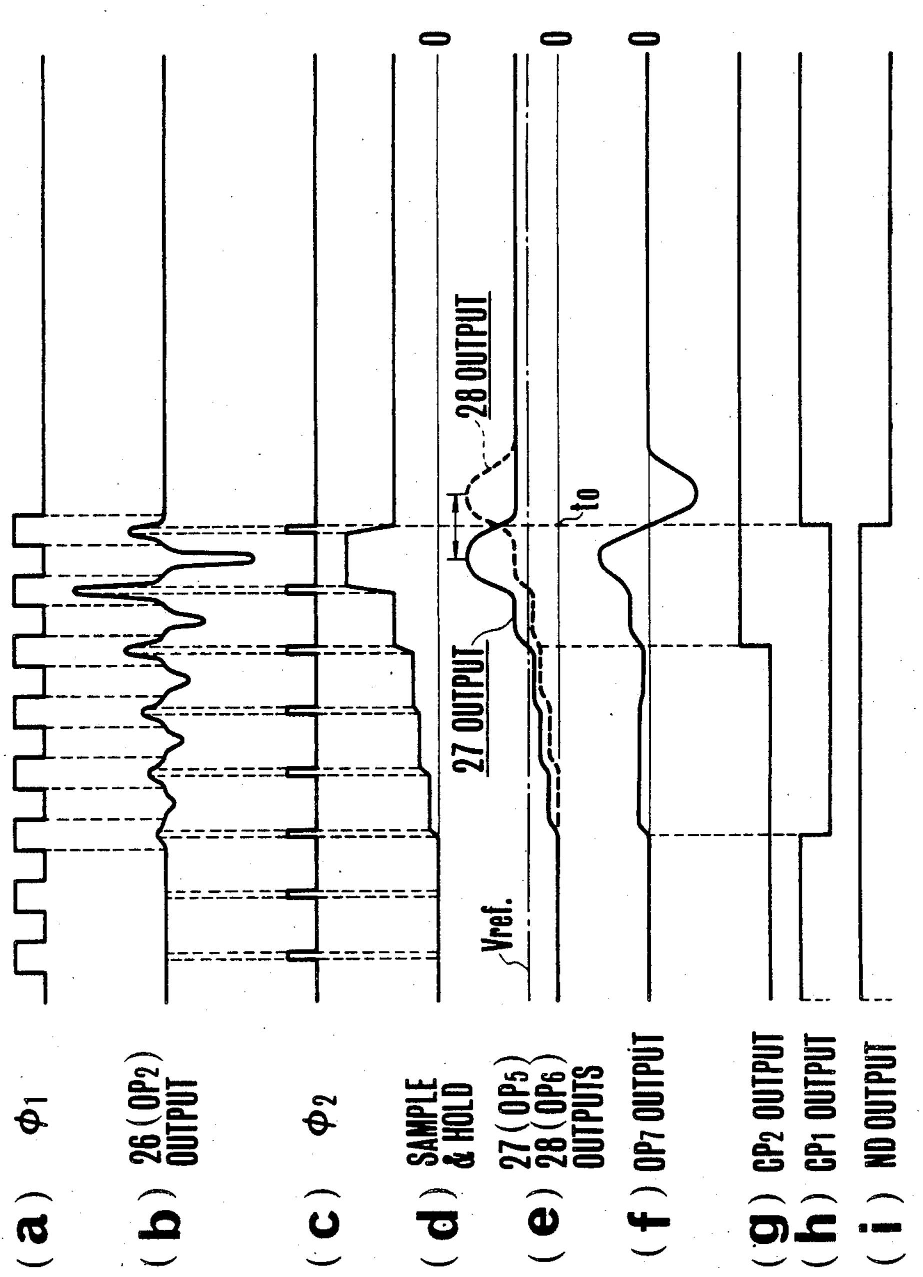
FIG. 4 is a timing chart showing the output wave forms of essential circuit blocks of the circuits shown in FIGS. 3A and 3B.

The following description is related to the electrical circuitry embodied in the distance detecting device shown in FIG. 1 with reference to FIG. 3A and FIG. 3B:

In FIG. 3A, which shows the control circuit provided for the light emitting element ED, the light emitting element ED is arranged such that, in order to make the light beam to be projected from the light emitting element ED for distance detection clearly discernible from sun light and other ambient lights that become noises in the distance detection, the light beam to be projected is amplitude modulated at several KHz. In the arrangement illustrated, reference clock pulses are generated by a clock oscillator OS. A clock divider DV receives the clock pulses and, by frequency dividing the pulses, produces timing pulses $\phi 1$ which are about 8 KHz as shown in FIG. 4(*a*) and timing pulses $\phi 2$ as shown in FIG. 4(*c*). The timing pulses $\phi 1$ produced by the clock divider are received by the base of a npn switching transistor Tr1 through a protection resistor R′1. The npn switching transistor Tr1 is arranged to have the above stated light emitting element ED connected to the collector thereof together with a protection resistor R′2. The resistor R′2 is connected to the plus side of a power source battery EV through a switch SW3 which can be manually opened and details of which will be described later herein and through the power source switch SW1. A boosting DC-to-DC converter CVT is arranged to have the clock oscillator OS and the clock divider DV receive power supply through this DC-to-DC converter. Meanwhile, the light emission stopping switch SW2 is disposed in the power supply route to the clock oscillator OS and the clock divider DV. When the power supply is cut off with this switch SW2 opened, both the output pulses $\phi 1$ and $\phi 2$ of the clock divider DV are kept at a low level.

In FIG. 3B which shows the detection circuit which is arranged to detect the distance to an object to be photographed on the basis of the output of the photosensitive element PD as mentioned in the foregoing, there is provided an A.C. amplifier circuit 25 which is arranged to amplify the output of the photosensitive element PD. The A.C. amplifier circuit 25 has a parallel connected arrangement of a gain restricting resistor R3 and a T-type low-pass filter which consists of resistors R1 and R2 and a capacitor C1 inserted in the negative feedback route of an operational amplifier OP1 as shown in the drawing. The photosensitive element PD is connected between the two input terminals of the operational amplifier OP1. A reference numeral indicates an active band pass filter circuit which is arranged to take out from the output signals of the amplifier circuit 25 only a signal of frequency that corresponds to the modulated frequency (about 8 KHz) of the light beam projected from the light emitting element EP. The active band pass filter circuit 26 includes operational amplifiers OP2–OP4, resistors R4–R9 and capacitors C2 and C3 which are arranged as shown in the drawing. The output of the above stated amplifier circuit 25 is supplied to the inversion input terminal of the operational amplifier OP2 through the resistor R4. A numeral 27 indicates a sample-hold circuit which samples and holds the output of the filter circuit 26 in response to the timing pulses $\phi 2$ coming from the above stated clock divider DV. The sample-hold circuit 27 comprises an output holding capacitor C4 and an analog gate AG. The analog gate is so arranged that, while the timing pulses $\phi 2$ are high, the gate is on to allow the output of the filter circuit 26 which is taken in through the resistor R10 to be supplied to the above stated capacitor C4. A reference symbol OP5 indicates a buffer operational amplifier which receives the output of the above stated sample-hold circuit 27 and performs impedance conversion thereof. A numeral 28 indicates a delay circuit which receives the output of the operational amplifier OP5 and delays it by a given length of time $\tau$. The delay circuit 28 is composed of a resistor R11 and a capacitor C5. There is provided another buffer operational amplifier OP6 which receives the output of the delay circuit 28 and performs impedance conversion thereof. A numeral 29 indicates a coincidence detecting circuit which receives the output of the operational amplifier OP5, i.e. the output of the sample-hold circuit 27, and the output of the operational amplifier OP6, i.e. the output of the delay ciruit 28 to detect coincidence between these two output signals. The coincidence detecting circuit 29 is composed of an operational amplifier OP7, resistors R12–R15 and a comparator CP1. Of these elements, the operational amplifier OP7 and the resistors R12–R15 constitute a differential amplifier circuit which is arranged to obtain difference between the output of the operational amplifier OP5 and that of the operational amplifier OP6. The output of the operational amplifier OP5 is supplied to the non-inversion input terminal of the operational amplifier OP7 through the resistor 14 and the output of the operational amplifier OP6 to the inversion input terminal of the operational amplifier OP7 through the resistor R12 respectively. The above stated comparator CP1 is provided for the purpose of detecting a point at which the output of the operational amplifier OP7 changes from a positive value to a negative value. The output of the operational amplifier OP7 is received at the inversion input terminal of the comparator CP1 while the non-inversion input terminal of the comparator is grounded. When the output of the operational amplifier OP7 is $\leqq 0$, the output of the comparator CP1 becomes high. Thus, a change of the output of the comparator CP1 from low to high indicates coincidence between the output of the sample-hold circuit 27 and the output of the delay circuit 28. A reference symbol RQ indicates a reference voltage generating circuit which produces a reference voltage Vref of a predetermined level. The output of the above stated operational amplifier OP5, i.e. the output of the sample-hold circuit 27, is compared with this reference voltage Vref at a comparator CP2, which receives the output of the operational amplifier OP5 at its non-inversion input terminal and the reference voltage Vref at its inversion input terminal. Therefore, the output of the comparator CP2 becomes high only when there obtains a condition of "the output of the operational amplifier $\geqq$ the reference voltage Vref". In other words, when the output of the sample-hold circuit 27 is at a low level, there is a possibility that the output of the comparator CP2 might be inverted by a noise and this might cause an erroneous action of the device. The reference voltage generating circuit RQ and the comparator CP2 are arranged to eliminate this possibility of an erroneous action. The output of the comparator CP2 is supplied to a NAND gate ND together with the output of another comparator CP1, i.e. the output of the incidence detecting circuit 29. A symbol Tr2 indicates a npn switching transistor which is provided for the purpose of controlling the electromagnet Mg1 in accordance with the output of the NAND gate ND. The base of the transistor Tr2 is connected to the output terminal of the NAND gate ND through a resistor R16 while the electromagnet Mg1 is connected to the collector side of the transistor Tr2 together with a diode D1 which is provided for the purpose of absorbing a counter-electromotive force. There is provided another npn switching transistor Tr3 which is arranged to control the electromagnet Mg2 in accordance with the output of the NAND gate ND. The base of the transistor Tr3 is connected to the output terminal of the NAND gate ND through a resistor R17. The electromagnet Mg2 is connected to the collector side of the transistor Tr3 together with a diode D2 which is provided for absorbing a counter-electromotive force and also with a switch SW4 which can be manually opened together with the switch SW3 shown in FIG. 3A and which will be described herein later. The above stated display element LD is controlled to light up or to be put off according to the output of the NAND gate ND by a npn switching transistor Tr4, the base of which is connected to the output terminal of the NAND gate ND through a resistor R18 while the display element LD is connected to the collector side of the transistor Tr4 together with a protection resistor R19.

The detection circuit illustrated in FIG. 3B is arranged to receive power supply through the DC-to-DC converter CVT which is shown in FIG. 3A.

The operation of the electric circuitry which is arranged as described in the foregoing will be understood from the following description with reference to FIG. 4.

Under a condition where the switches SW3 and SW4 are closed, when the power source SW1 is closed by the first step of a depressing operation on the release rod 15, the detection circuit shown in FIG. 3B will receive power supply through the DC-to-DC converter CVT. Then, since the output of the sample-hold circuit 27 is still lower at least than the reference voltage Vref produced by the reference voltage generating circuit R0 under this condition as shown in FIG. 4(*e*), the output of the comparator CP2 is low as shown in FIG. 4(*g*). Accordingly, the output of the NAND gate ND bcomes high as shown in FIG. 4(*i*). This causes the transistors TR2–Tr4 to be turned on to energize the electromagnets Mg1 and Mg2 and to light up the display element LD. With the electromagnets Mg1 and Mg2 energized, the second lock lever 12 is moved to an unlocking position while the release lock member 21 is moved to its release lock position. Then, with the second lock lever thus displaced, the light emission stopping switch SW2 is closed. With the switch SW2 closed, the clock oscillator OS and the clock divider DV shown in FIG. 3A are rendered operative by power supply which is effected through the DC-to-DC converter CVT. As a result of this, the timing pulses $\phi$1 and $\phi$2 are produced by the clock divider DV as shown in FIGS. 4(*a*) and (*c*). The transistor Tr1 which receives the timing pulses $\phi$1 at its base comes to operate on and off in response to the timing pulses $\phi$1. Accordingly, the light emitting element ED is caused to flicker by the frequency of the timing pulses $\phi$1. Thus, a light beam which is amplitude modulated at about 8 KHz is projected. On the other hand, the sample-hold circuit 27 begins to sample and hold the output of the active band pass filter circuit 26 in response to the timing pulse $\phi$2. Under this condition, when the ratchet wheel 8 is released from the locking action of the first lock lever 9 by further depression of the release rod 15, the photograph taking lens L5 begins to move. Then, in association with the movement of the lens L5, the mirror M1 rotates to cause the sweeping of the light beam. The output of the photosensitive element PD which is then produced in response to a reflected light beam is amplified by the A.C. amplifier circuit 25 before it is supplied to the active band pass filter circuit 26. At the active band pass filter circuit 26, only a signal of a frequency component that corresponds to the modulated frequency of the projected light beam is mainly taken out as shown in FIG. 4(*b*) and the output of the filter circuit 26 which is thus obtained is sampled and held by the sample-hold circuit 27 at the timing of the timing pulses $\phi 2$. The analog gate AG is turned on only when the timing pulses $\phi 2$ are at a high level. Therefore, when the analog gate AG is on, the capacitor C4 is charged up to the level of the output of the filter circuit 26 as the output of the active band pass filter circuit 26 is impressed thereon through the resistor R10 and the analog gate AG. Then, if the output level of the filter circuit 26 is higher than the voltage level that has been held at the capacitor C4 until that time, the capacitor C4 is charged up to the output level of the filter circuit 26 through the analog gate AG as mentioned above. Conversely, however, if the output level of the filter circuit 26 is lower than the voltage level that has been held at the capacitor C4, the holding voltage of the capacitor C4 is discharged through the analog gate AG until the level of the holding voltage of the capacitor C4 becomes equal to the output level of the filter circuit 26. Then, the sample-hold circuit 27 begins to sample and hold the output of the filter circuit 26 as shown in FIG. 4(*d*). In this case, the resistor R10 and the capacitor C4 constitute a smoothing circuit. Therefore, in an actual application, the output of the sample-hold circuit 27 becomes a smoothed signal as shown in FIG. 4(*e*). The output of the sample-hold circuit 27 is supplied to the delay circuit 28 through the buffer operational amplifier OP5. Following this, the delay circuit 28 produces a delayed signal which has a given delay time $\tau$ relative to the output of the sample-hold circuit 27 as shown in FIG. 4(*e*). The output of the delay circuit 28 is supplied through the buffer operational amplifier OP6 to the inversion input terminal of the operational amplifier OP7 which constitutes a differential amplifier circuit within the coincidence detecting circuit 29. At this time, however, the output of the above stated operational amplifier OP5 is supplied to the non-inversion input terminal of this operational amplifier OP7. Accordingly, the operational amplifier OP7 then produces a signal which corresponds to the difference between the output of the sample-hold circuit 27 and the output of the delay circuit 28 as shown in FIG. 4(*f*). This output of the operational amplifier OP7 is supplied to the inversion input terminal of the comparator CP1. As is apparent from FIG. 4(*e*), (*f*) and (*h*), in the beginning, the output of the sample-hold circuit 27 is equal to the output of the delay circuit 28 and, accordingly, the output of the operational amplifier OP7 is 0. Therefore, at this time, the output of the comparator CP1 is high. However, as will be understood from FIG. 4(*e*) and (*g*), while there obtains the relation of "the output of the sample-hold circuit 27 < the reference voltage Vref", the output of the comparator CP2 is low. Therefore, in the beginning, the output of the NAND gate ND remains high even though the output of the comparator CP1 becomes high. Then, when the output of the sample-hold circuit 27 becomes higher than the output of the delay circuit 28 during the sweeping process of the light beam, there obtains the condition of "the output of the operational amplifier OP7 > 0". At this point of time, therefore, the output of the comparator CP1 changes from high to low. When this condition further progresses and the output of the sample-hold circuit 27 reaches its peak value, the output of the sample-hold circuit 27 and the output of the delay circuit 28 come to cross each other at a point of time "to" which is $\frac{1}{2}\tau$ after to the point of time at which the output of the sample-hold circuit 27 has reached the peak value as shown in FIG. 4(*e*). The output of the operational amplifier OP7 changes from positive to negative at this point of time "to" as shown in FIG. (*f*). Therefore, the output of the comparator CP1 changes from low to high at this point of time "to". On the other hand, at this point of time, there obtains a condition of "the output of the sample-hold circuit 27 ≧ the reference voltage Vref". The output of the comparator CP2, therefore, is high as shown in FIG. 4(*g*). Accordingly, the output of the NAND gate ND immediately changes from high to low at the point of time "to" at which the output of the comparator CP1 has changed from low to high as shown in FIG. 4(*i*). With the output of the NAND gate ND having thus changed to low, the transistors Tr2–Tr4 are turned off to deenergize the electromagnets Mg1 and Mg2 and the display element LD is turned off. Then, as mentioned in the foregoing, the photograph taking lens L5 is stopped at a focused position by the second lock lever 12 while the release lock by the release lock member 21 is released. When the second lock lever rotates to stop the photograph taking lens 5, the light emission stopping switch SW2 which is shown in FIG. 3A is opened to cut off power supply to the clock oscillator OS and the clock divider DV. Then, since the timing pulses $\phi 1$ and $\phi 2$ from the clock divider DV are no longer produced, the light emission by the light emitting element ED is stopped. In the meantime, as will be understood from FIG. 4(*d*) and (*e*), the sample-hold circuit 27 then comes to continuously retain the output of the active band pass filter circuit 26 which is sampled and held in response to the last timing pulse $\phi 2$. After the point of time to, therefore, the comparators CP2 and CP1 continue to produce high level outputs as shown at FIG. 4(*g*) and (*h*) and, thus, the NAND gate ND continues to produce a low level output after the point of time to. Accordingly, the electromagnets Mg1 and Mg2 are kept in deenergized states after the point of time to respectively.

In the event of adverse conditions arising one on top of another at the time of photographing thus causing, for example, the output of the sample-hold circuit 27 to become lower than the reference voltage Vref, the output of the comparator CP2 remains low and the output of the NAND gate ND remains high. In that event, therefore, the second lock lever 12 is not set free. Accordingly, the photograph taking lens L5 is stopped at an infinite-distance focusing position defined by the stopper pin 3. Meanwhile, the display element LD remains alight to warn the photographer of the inadequate photographing condition. In addition to this warning, the release lock member 21 is not set free under such a condition. Therefore, photographing is impossible because the release rod 15 is thus prevented from being further depressed to the second step stroke thereof. However, in cases where it is desirable to perform a photographing operation even under such a condition, a manual operation member, which is not shown, is operated to make photographing possible by opening therewith the switch SW3 which is shown in FIG. 3A and the switch SW4 which is shown in FIG. 3B. With the switches SW3 and SW4 opened, the light emission by the light emitting element ED is stopped while the electromagnet Mg2 is deenergized to release the release lock being effected by the release lock member 21, so that photographing can be performed under an infinite-distance focused condition.

In the structural arrangement of the embodiment described in the foregoing, the coincidence detecting circuit 29 is arranged in such a manner that: It is provided with the differential amplifier circuit consisting of an operational amplifier OP7 and resistors R12–R15 for obtaining thereby the difference between the output of the operational amplifier OP5, i.e. that of the sample-hold circuit 27, and the output of the operational amplifier OP6, i.e. that of the delay circuit 28; and the difference output which is thus obtained is compared with a grounding level by the comparator CP1 to detect a point at which the output of the operational amplifier OP5 and that of the operational amplifier OP6 come to coincide with each other. However, this coincidence detection may be also accomplished, for example, without the differential amplifier circuit which consists of the operational amplifier OP7 and resistors R12–R15 and by directly supplying the outputs of the operational amplifiers OP5 and OP6 to the inversion input terminal and the non-inversion input terminal of the comparator CP1 respectively. In this case, the output obtained from the comparator CP1 for the outputs of the sample-hold circuit 27 and the delay circuit 28 is also as shown in FIG. 4(*h*). Therefore, the present invention is not limited to the arrangement of this embodiment. However, in accordance with this embodiment, the differential amplifier circuit which consists of the operational amplifier OP7 and the resistors R12–R15 serves to improve signal resolution in coincidence detection for higher accuracy because the difference signal is amplified thereby before the signal is produced.

Further, in this embodiment, the delay time $\tau$ which is to be set at the delay circuit 28 is closely related to the speed of sweeping of the light beam to be effected by the rotation of the rotating mirror M1. Assuming that the rotating speed of the rotating mirror M1 is 1/20 degree per m.sec. or thereabout, the delay time is 2 to 3 m.sec. In the embodiment example shown in FIG. 3B, a R-C circuit which is most popularly used is employed as the delay circuit 28. The same results can also be obtained by replacing the R-C circuit with a known L-C delay circuit or other delay circuits consisting of solid semiconductor element such as CCD (charge coupled device), BBD (bucket brigade device), etc.

Further, in the automatic focusing camera which is described as an embodiment example in the foregoing, the rotation of the rotating mirror M1 is arranged to be stopped concurrently with stopping of the movement of the lens barrel 1 by the second lock lever 12. However, the invention is not limited to such arrangement. It may be replaced with another arrangement in which: The link mechanism provided for interlocking the mirror M1 with the lens barrel 1 is modified to allow the mirror M1 to rotate to a predetermined end position of its deflection angle without being stopped even when the lens barrel is stopped.

The automatic focus camera incorporating therein an embodiment of the distance detecting device of this invention has the features as described in the foregoing. Next, referring to FIGS. 5 through 10, the following description covers improvements on the A.C. amplifier circuit 25 which is shown in FIG. 3B and which is arranged to receive the output of the photosensitive element PD when the light emitting element ED projects a light beam modulated to a given frequency.

FIG.5 shows an amplifier circuit which has a structural arrangement identical with the above stated amplifier circuit 25. This circuit comprises an operational amplifier OP1, a T-type low-pass filter circuit and a resistor R3 which has a high resistance value for gain restriction. The filter circuit and the resistor are connected in parallel with each other. The operational amplifier OP1 is of a high input impedance with its non-inversion input terminal ITI grounded. The T-type low-pass filter circuit comprises resistors R1 and R2 at one end thereof while the other end thereof is grounded. The above stated photosensitive element PD (which is a photovoltaic element) is connected between the two input terminals IT1 and IT2 of the operational amplifier OP1 to take out therefrom a signal in the form of a photocurrent. With this arrangement, photosignal detection can be accomplished with excellent linearity over a wide range.

Assuming that an output current of photosensitive element PH in this amplification circuit, i.e. the above stated photocurrent, is ip, generally the output voltage of the amplification circuit can be expressed by:

$$Vout = \left\{ \frac{j\omega C_1 R_1 R_2 + (R_1 + R_2)}{j\omega C_1 R_1 R_2 + (R_1 + R_2 + R_3)} \right\} \cdot R_3 \cdot ip \quad (1)$$

In the low frequency region of $\omega \simeq 0$, the output voltage becomes:

$$Vout = \frac{R_1 + R_2}{R_1 + R_2 + R_3} \cdot R_3 \cdot ip \cong (R_1 + R_2) \cdot ip \quad (2)$$

and in a frequency region which can be expressed by $$\omega >> \frac{R_1 + R_2 + R_3}{C_1 R_1 R_2}$$

the output voltage becomes:

$$Vout = R_3 \cdot ip \quad (3)$$

In other words, in the low frequency region, as will be understood from Formula (2) above, the output is determined by the sum of the values of the resistors $R_1$ and $R_2$ ($R_1+R_2$), while in the high frequency region, the output is determined by the value of the resistor $R_3$ as will be understood from Formula (3) above. Therefore, with the resistor $R_3$ arranged to have a large resistance value and the sum of the resistance values of the resistors $R_1$ and $R_2$ ($R_1+R_2$) arranged to be small, a signal component of a D.C. or of a low frequency, i.e. a signal component resulting from an ambient light, can be suppressed and a signal component of a predetermined frequency, i.e. the signal component resulting from a signal light to be handled, can be largely extracted. It will be understood that, by dividing Formula (2) by Formula (3), the relation of the low frequency component to the high frequency component becomes $(R_1+R_2)/R_3$. Then, assuming that $R_1+R_2=100$ kΩ and $R_3=2$ MΩ, the low frequency component is 1/20 of the high frequency component. Therefore, the desired high frequency component can be largely extracted while the undesired low frequency component is suppressed to a sufficient degree.

However, an amplifier circuit of such arrangement has the following inconvenience: With a T-type low-pass filter circuit which consists of resistors $R_1$ and $R_2$ and a capacitor $C_1$ provided in the negative feedback route of an operational amplifier $OP_1$, a noise component produced at the operational amplifier $OP_1$, is also amplified. Therefore, compared with an arrangement in which only the resistor $R_3$ is provided in the negative feedback route of the operational amplifier $OP_1$, the noise component in the signal will be increased thus degrading the S/N ratio of the whole amplifier circuit to a great degree. Assuming that an operational amplifier having an FET input terminal is employed as the operational amplifier $OP_1$; and assuming that a noise current and a thermal noise are negligible and that a noise voltage produced at the inversion input terminal $IT_2$ of the amplifier $OP_1$ is $\overline{e_n^2}$, a noise voltage $\overline{V_{on}^2}$, that is produced at the output terminal OT of the amplifier can be expressed by:

$$\overline{V_{on}^2} = \left| \frac{j\omega C_1(R_1R_2 + R_2R_3) + (R_1 + R_2 + R_3)}{j\omega C_1R_1R_2 + (R_1 + R_2 + R_3)} \right|^2 \cdot \overline{e_n^2} \quad (4)$$

Then, in a low frequency region of $\Omega \simeq 0$, the following relation obtains:

$$\overline{V_{on}^2} \simeq \overline{e_n^2} \quad (5)$$

Further, in a high frequency region of $\Omega \simeq \infty$, the noise voltage becomes:

$$\overline{V_{on}^2} = \left(1 + \frac{R_3}{R_1}\right)^2 \cdot \overline{e_n^2} \quad (6)$$

In this manner, in the predetermined frequency region, the above stated arrangement of the A.C. amplification causes an increase in the noise to a value $(1+R_3/R_1)$ times as much as the noise that result from an arrangement in which there is provided only the resistor $R_3$ in the negative feedback route of the operational amplifier $OP_1$.

Generally, when a gain for a whole system has been determined, it is preferable for improvement in the S/N ratio to set a gain for a preamplification stage as large as possible. In the circuit shown in FIG. 5, the value of the resistor $R_3$ is determined from the gain in that stage. Further, the sum $(R_1+R_2)$ of the values of the resistors $R_1$ and $R_2$ is determined from a predetermined D.C. removal ratio $\gamma=(R_1+R_2)/R_3$; while the capacity of the capacitor $C_1$ is determined to have the relation of Formula (3) established at a predetermined frequency $\omega_o$. The gain to be obtained through the amplifier circuit is determined from the output value of the photosensitive element PD relative to the highest level of the signal light to be detected and the saturation level of the circuit. Then, the resistance value of the gain restricting resistor $R_3$ is determined according to the gain to be obtained through the amplifier circuit. Next, a D.C. gain is determined from the output value of the photosensitive element relative to the highest level of ambient lights. The sum $(R_1+R_2)$ of the values of the resistors $R_1$ and $R_2$ is then determined from Formula (2). Then, the value of the resistor $R_1$ disposed on the side of the inversion input terminal $IT_2$ of the operational amplifier $OP_1$ is set at a value as high as possible while the value of the resistor $R_3$ and the D.C. removal ratio $\gamma=(R_1+R_2)$ are kept unchanged. By this, as will be understood from Formula (6), the circuit noise can be lowered without causing any change in the frequency characteristic of the gain. Further, the maximum value permissible for the resistor $R_1$ is determined according to the minimum value of the resistor $R_2$ which is determined by the lowest load impedance of the operational amplifier $OP_1$. The capacity of the capacitor $C_1$ is set to be $R_1R_2C_1$=constant to have a fairly unvarying frequency characteristic.

Figure 6:
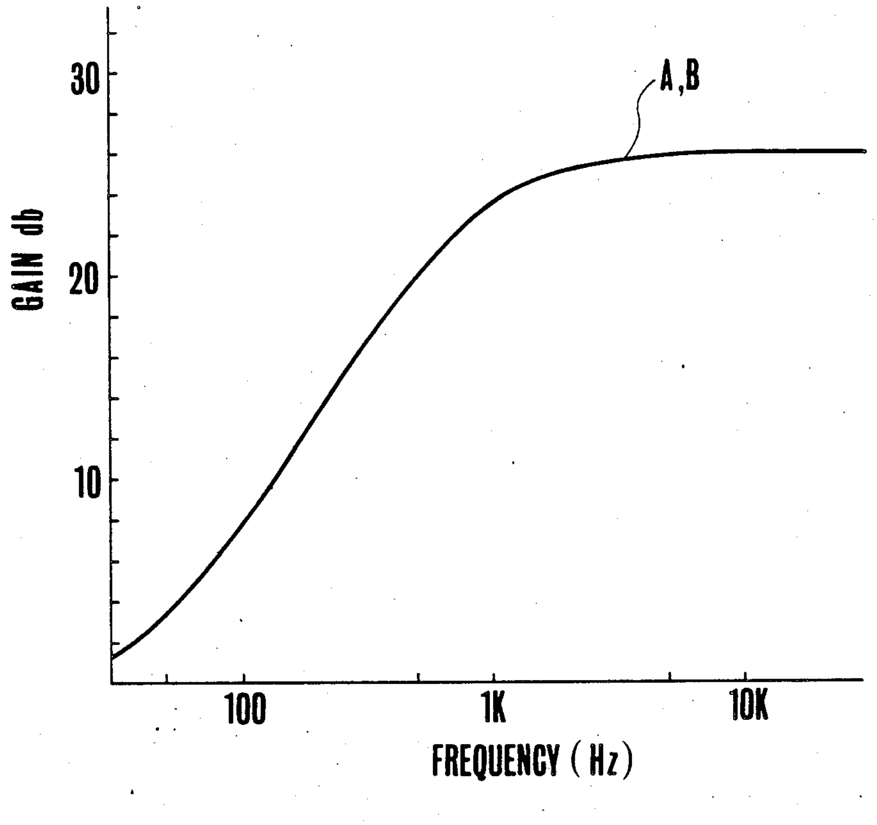
FIGS. 6 and 7 are graphical representations of the frequency characteristics of gains and circuit noises obtained under specific setting conditions of the amplifier circuit shown in FIG. 5.
Figure 7:
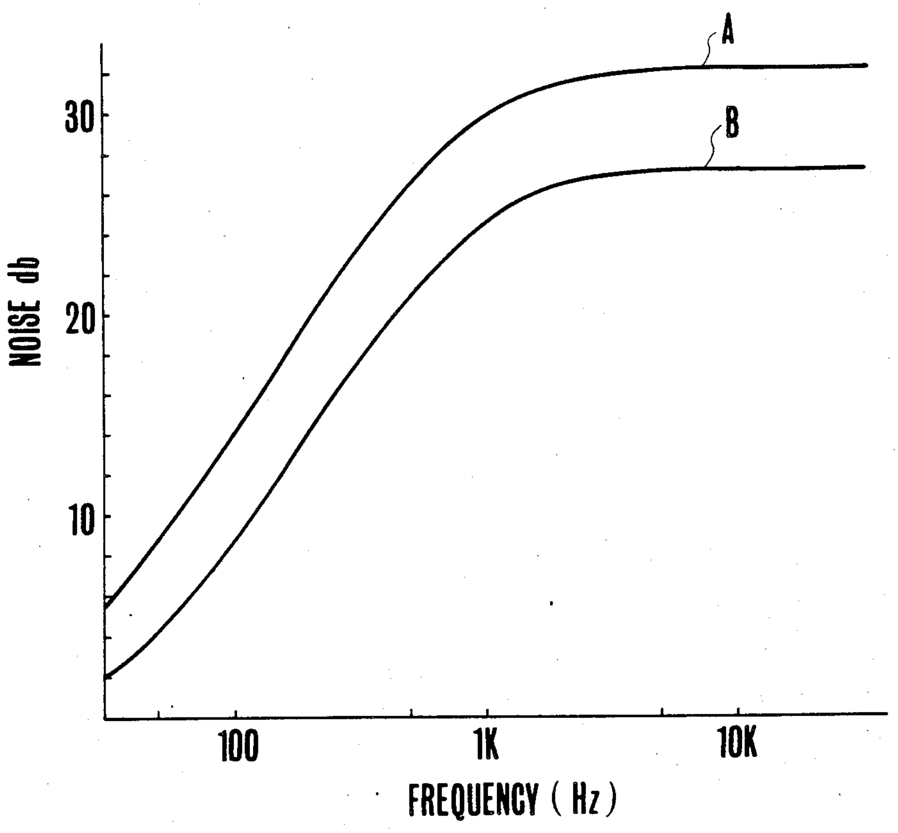

FIGS. 6 and 7 respectively show by way of example frequency characteristics of gain and circuit noise obtained in the case of $R_3=2$ MΩ and $\gamma=1/20$. In each of the drawings, FIGS. 6 and 7, a curve labeled as A represents a characteristic obtained when $R_1=R_2=50$ kΩ and $C_1=0.167$ μF and a curve labeled as B represents a characteristic obtained when $R_1=90$ KΩ, $R_2=10$ KΩ and $C_1=0.422$ μF. As is apparent from these drawings, the noise evidently decreases in the case of the latter.

Referring now to FIG. 8, a second improvement example is described below: In the circuit arrangement illustrated, the feedback resistor $R_3$ which is used in the circuit arrangement shown in FIG. 5 is excluded there and is replaced by a resistor $R_4$, which is arranged in series with the capacitor $C_1$ in the T-type low-pass filter circuit. The output voltage Vout of the amplifier circuit which is arranged in this manner can be expressed by:

$$Vout = \left\{ (R_1 + R_2) + \frac{j\omega C_1R_1R_2}{1 + j\omega C_1R_4} \right\} \cdot ip \quad (1')$$

The noise voltage $\overline{V_{on}^2}$ obtained at the output terminal OT relative to the noise voltage $\overline{e_n^2}$ produced at the inversion input terminal $IT_2$ of the operational amplifier $OP_1$ can be expressed by:

$$\overline{V_{on}^2} = \frac{1 + \omega^2C_1^2(R_2 + R_4)^2}{1 + \omega^2C_1^2R_4^2} \cdot \overline{e_n^2} \quad (2')$$

From Formula (1'), the output voltage Vout in the low frequency region of $\omega \simeq 0$ can be expressed by:

$$Vout = (R_1 + R_2) \cdot ip \quad (3')$$

In the frequency region expressed by $\Omega >> 1/C_1R_4$, the output voltage Vout becomes:

$$Vout = \{(R_1 + R_2) + R_1 \cdot R_2/R_4\} \cdot ip \quad (4')$$

Then, the D.C. removal ratio $\gamma$ of the circuit can be expressed by:

$$\gamma = \frac{R_1 + R_2}{(R_1 + R_2) + R_1 \cdot R_2/R_4} \quad (5')$$

From Formula (2'), the noise voltage $\overline{V_{on}^2}$ at the output terminal OT in the low frequency region $\omega \simeq 0$ is:

$$\overline{V_{on}^2} = \overline{e_n^2} \quad (6')$$

and, in the region of $\omega >> 1/C_1R_4$, the noise voltage becomes:

$$\overline{V_{on}^2} = (1 + R_2/R_4)^2 \cdot \overline{e_n^2} \quad (7')$$

Thus, with the circuit arrangement shown in FIG. 8 employed, the noise increases to a value $(1+R_2/R_4)$ times as much as the noise obtained in the case of a D.C. arrangement.

In the circuit shown in FIG. 8, $(R_1+R_2)+R_1 \cdot R_2/R_4$ is determined from the gain of the whole circuit; $(R_1+R_2)$ is determined from the D.C. removal ratio $\gamma$; and $R_1 \cdot R_2/R_4$ is determined as difference between the two. Under this condition, the value of the resistor $R_1$ is set as high as possible and the value of $R_2/R_4$ as small as is possible. By this, as apparent from Formula (7'), the circuit noise can be minimized without causing any change in the frequency characteristic of the gain.

Figure 9:
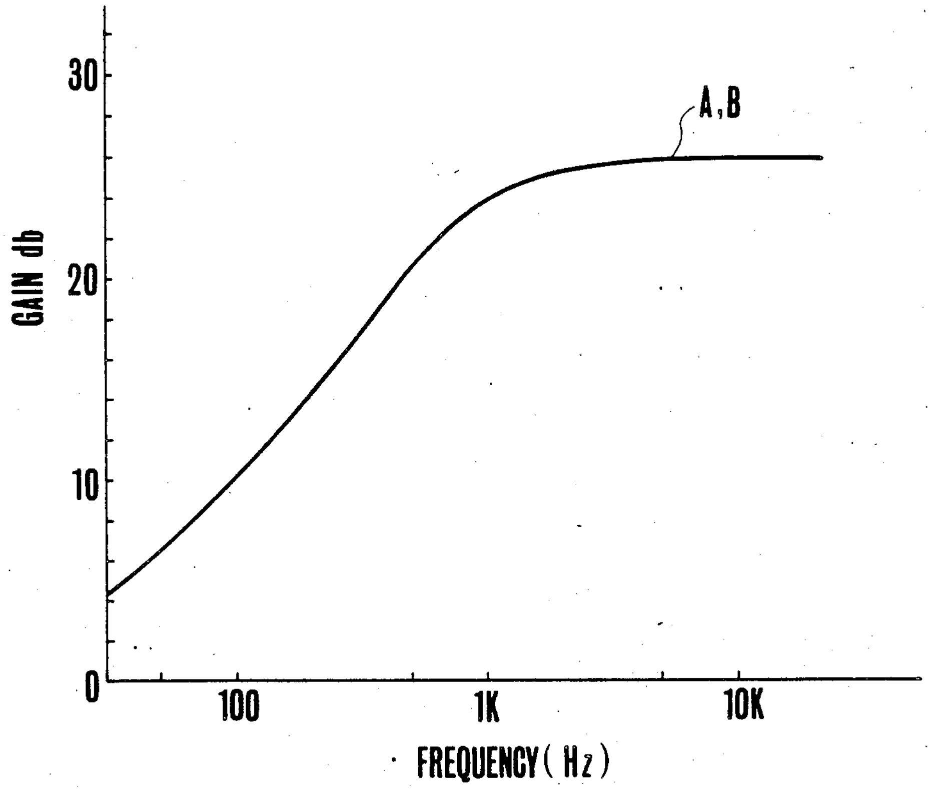
FIGS. 9 and 10 are graphic representations of the frequency characteristics of gains and noises under specific setting conditions of the amplifier circuit shown in FIG. 8.
Figure 10:
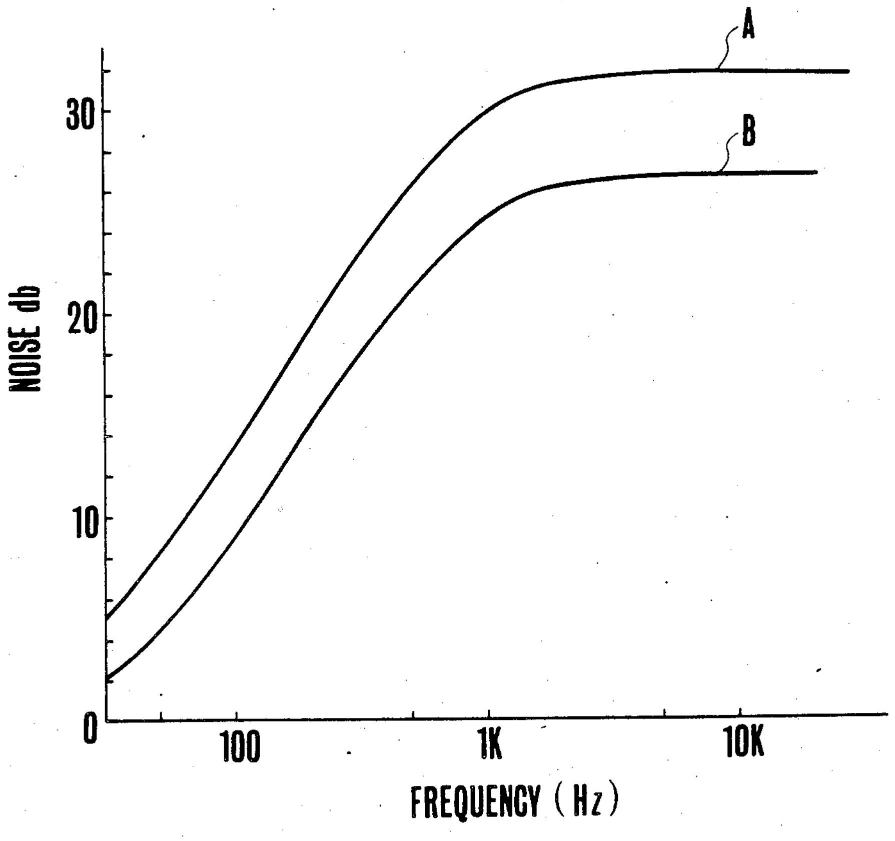

When, for example, the A.C. gain is assumed to be 2 MΩ and the D.C. removal ratio $\gamma$ to be 1/20 in the same manner as in the preceding embodiment example, i.e. when $R_1+R_2=100$ KΩ, the frequency characteristic of the gain and the circuit noise are as shown in FIGS. 9 and 10. In each of these drawings, a curve labeled as A represents a characteristic obtained when $R_1=R_2=50$ KΩ, $R_4=50/38$ KΩ and $C_1=0.15$ μF. A curve which is labeled as B represents a characteristic obtained when $R_1=90$ KΩ, $R_2=10$ KΩ, $R_4=10/21$ KΩ and $C_1=0.41$ μF. As apparent from these illustrations, the noise evidently decreases in the case of the latter.

There is no difference between the circuit arrangement shown in FIG. 8 their circuit shown in FIG. 5 in terms of the noise characteristic. However, an advantage of the former over the latter lies in that: The former operates with the gain restricting resistor $R_3$ which is very sensitive to variation in temperature and also hinders the use of a integrated circuit arrangement due to its high resistance value. Therefore, the circuit arrangement shown in FIG. 8 more readily allows a a low noise amplification circuit to be obtained which is more suitable for integrated circuit arrangement than the circuit shown in FIG. 5.

The invention improvements which have been described with reference to FIG. 5 through FIG. 10, thus provide a photocurrent amplifier circuit having a T-type low-pass filter circuit which is composed of resistors and a capacitor and is disposed in the negative feedback route of an operational amplifier. The amplifier circuit is capable of minimizing circuit noise without causing any adverse change in the frequency characteristic of gain and, despite of the provision of the T-type low pass filter circuit in the negative feedback route of its operational amplifier, the S/N ratio of the whole circuit can be enhanced to a sufficient degree. The circuit arrangement is advantageous particularly because it is capable of very sensitively detecting a pulselike weak signal light of a relatively high frequency transmitted under an ambient light illumination (background light) which varies over a wide range either at a low frequency or in a D.C.-like manner. Therefore, with the above stated improvement applied to the amplifier circuit 25 shown in FIG. 3B, noises caused by an exterior disturbance such as sun light or a fluorescent lamp illumination can be suppresed to a minimum to permit highly sensitive detection of a signal light which is projected from the light emitting element ED of the distance detecting device and is reflected by an object to be photographed, so that accuracy in detecting a distance to the object can be increased to a great degree.

What is claimed is:

1. A device, comprising:

(A) means for projecting a radiation to an object;

(B) projection control means for causing said radiation projecting means to substantially function selectively with a predetermined frequency;

(C) means for sensing the radiation reflected by and coming from the object, and sensing means producing an output signal indicative of energy intensity of the received radiation; and (D) circuit means for processing the output signal of said sensing means, said circuit means including signal extracting means for extracting from the output signal of the sensing means responding to the radiation projected from said radiation projecting means and for providing the extracted signal, said extracting means comprising:

first means for extracting a component of said predetermined frequency from the output signal of said sensing means; and second means for sampling and holding the output signal of said sensing means corresponding to the substantially functioning condition of said radiation projecting means in association with the control action of said projection control means on said radiation projecting means.

2. The device according to claim 1, wherein said first means is a band-pass-filter circuit which transmits the signal component of said predetermined frequency, and said second means is a sample and hold circuit which is arranged so as to operate in association with the control action of said projection control means on said radiation projecting means.

3. A system for sensing a radiation modulated with a predetermined frequency, comprising:

(A) means for sensing said radiation, said sensing means producing an output signal indicative of the intensity of the received radiation;

(B) circuit means for processing the output signal of said sensing means, said circuit means including an amplifying circuit receiving the output signal of the sensing means, wherein said amplifying circuit comprises:

(1) an operational amplifier having two input terminals and an output terminal and receiving the output of said sensing means;

(2) a series connection of first and second resistors, the first resistor being connected to one of the input terminals of said amplifier and said second resistor being connected to the output terminal of the amplifier;

(3) a capacitor disposed between the connecting point of said first and second resistors and a terminal of a predetermined potential; and (4) a third resistor connected in parallel with said series connection of said first and second resistors;

(C) wherein $R_1$, $R_2$ and $R_3$ are resistances of said first, second and third resistors, respectively, and the value of $R_1$ is greater than that of $R_2$ so as to reduce an increase factor of $(1+R_3/R_1)$ of a noise voltage generating at an inversion input terminal of the operational amplifier due to amplification of a signal of a predetermined frequency band containing said predetermined frequency by the amplifying circuit under a predetermined gain of the amplifying circuit determined by a predetermined value of $R_3$ and under a predetermined DC elimination ratio of $(R_1+R_2)/R_3$ of the amplifying circuit; and (D) thereby the noise of the amplifying circuit is reduced but the gain of the amplifying circuit over said predetermined frequency band containing said predetermined frequency remains substantially unchanged as compared to a case where the values of $R_1$ and $R_2$ are equal.

4. The system according to claim 3, wherein the resistance value of the first resistor is selected to be the largest value permitted for the saturation of the amplifying circuit.

5. A system for sensing a radiation modulated with a predetermined frequency, comprising:

(A) means for sensing said radiation, said sensing means producing an output signal indicative of the intensity of the received radiation;

(B) circuit means for processing the output signal of said sensing means, said circuit means including an amplifying circuit receiving the output signal of the sensing means, wherein said amplifying circuit comprises:

(1) an operational amplifier having two input terminals and an output terminal and receiving the output of said sensing means;

(2) a series connection of first and second resistors, the first resistor being connected to one of the input terminals of said amplifier and said second resistor being connected to the output terminal of the amplifier;

(3) a capacitor disposed between the connecting point of said first and second resistors and a terminal of a predetermined potential; and (4) a third resistor connected in series with said capacitor;

(C) wherein $R_1$, $R_2$ and $R_4$ are resistances of the first, second and third resistors, respectively, and the value of $R_1$ is greater than that of $R_2$ so as to reduce an increase factor of $(1+R_2/R_4)$ of a noise voltage generated at an inversion input terminal of said operational amplifier due to amplification of a signal of a predetermined frequency band containing said predetermined frequency by the amplifying circuit under a predetermined gain of the amplifying circuit determined by a predetermined value of $$R_1 + R_2 + \frac{R_1 \cdot R_2}{R_4}$$

and under a predetermined DC elimination of $$\frac{R_1 + R_2}{R_1 + R_2 + \frac{R_1 \cdot R_2}{R_4}}$$

of the amplifying circuit; and (D) thereby the noise of the amplifying circuit is reduced but the gain of the amplifying circuit over said predetermined frequency band containing said predetermined frequency remains substantially unchanged as compared to a case where the values of $R_1$ and $R_2$ are equal.

6. The system according to claim 5, wherein the resistance value of the first resistor is selected to be the largest value permitted for the saturation level of the amplifying circuit.

7. In an active type automatic focusing system comprising means for projecting a signal modulated with a predetermined frequency to an object and means for detecting the signal reflected by and coming from the object, said detecting means including:

(A) a sensing element sensitive to said signal;

(B) an operational amplifier coupled to said sensing element, said amplifier having a feed-back loop between an output thereof and one of the inputs thereof;

(C) a low-pass filter disposed in the feed-back loop of said amplifier, said filter comprising:

(1) a series connection of first and second resistors, the first resistor being connected to one of the input terminals of said amplifier and the second resistor being connected to the output terminal of the amplifier;

(2) a capacitor disposed between the connecting point of said first and second resistors and a terminal of a predetermined potential; and (3) a third resistor connected in parallel with said series connection of said first and second resistors;

(D) wherein said amplifier and said low-pass filter constitute a high-pass filter circuit and $R_1$, $R_2$ and $R_3$ are resistances of the first, second and third resistors, respectively, and the value of $R_1$ is greater than that of $R_2$ so as to reduce an increase factor of $(1+R_3/R_1)$ of a noise voltage generating at an inversion input terminal of the operational amplifier due to amplification of a signal of a predetermined frequency band containing said predetermined frequency by the high-pass filter circuit under a predetermined gain of the high-pass filter circuit determined by a predetermined value of $R_3$ and under a predetermined DC elimination ratio of $(R_1+R_2)/R_3$ of the high-pass filter circuit; and (E) thereby the noise of the high-pass filter circuit is reduced but the gain of the high-pass filter circuit over said predetermined frequency band containing said predetermined frequency remains substantially unchanged as compared to a case where the values of $R_1$ and $R_2$ are equal.

8. The detecting means according to claim 7, wherein the resistance value of the first resistor is selected to be the largest value permitted for the saturation level of the high-pass filter circuit.

9. In an active type automatic focusing system comprising means for projecting a signal modulated with a predetermined frequency to an object and means for detecting the signal reflected by and coming from the object, said detecting means including:

(A) a sensing element sensitive to said signal;

(B) an operational amplifier coupled to said sensing element, said amplifier having a feed-back loop between an output thereof and one of the inputs thereof;

(C) a low-pass filter disposed in the feed-back loop of said amplifier, said filter comprising:

(1) a series connection of first and second resistors, the first resistor being connected to one of the input terminals of said amplifier and the second resistor being connected to the output terminal of the amplifier;

(2) a capacitor disposed between the connecting point of said first and second resistors and a terminal of a predetermined potential; and (3) a third resistor connected in series with said capacitor;

(D) wherein said amplifier and said low-pass filter constitute a high-pass filter circuit and $R_1$, $R_2$ and $R_4$ are resistances of the first, second and third resistors, respectively, and the value of $R_1$ is greater than that of $R_2$ so as to reduce an increase factor of $(1+R_2/R_4)$ of a noise voltage generating at said input terminals of the operational amplifier due to amplification of a signal of a predetermined frequency band containing said predetermined frequency by the high-pass filter circuit under a predetermined gain of the high-pass filter circuit determined by a predetermined value of $$R_1 + R_2 + \frac{R_1 \cdot R_2}{R_4}$$

and under a predetermined DC elimination ratio of $$\frac{R_1 + R_2}{R_1 + R_2 + \frac{R_1 \cdot R_2}{R_4}}$$

of the high-pass filter circuit; and (E) thereby the noise of the high-pass filter circuit is reduced but the gain of the high-pass filter circuit over said predetermined frequency band containing said predetermined frequency remains substantially unchanged as compared to a case where the values of $R_1$ and $R_2$ are equal.

10. The detecting means according to claim 9, wherein the resistance value of the first resistor is selected to be the largest value permitted for the saturation level of the amplifying circuit.

11. An amplifying circuit for amplifying a signal modulated with a predetermined frequency, comprising:

(1) an amplifier having two input terminals and an output terminal;

(2) a series connection of first and second resistors, the first resistor being connected to one of the input terminals of said amplifier and the second resistor being connected to the output terminal of the amplifier; and (3) a capacitor disposed between the connecting point of said first and second resistors and a terminal of a predetermined potential;

(4) wherein said amplifying circuit has a predetermined DC saturation level and predetermined frequency characteristics:

said amplifier has a predetermined output impedance; and $R_1$ and $R_2$ are resistances of said first and second resistors, respectively, $C_1$ is the capacitance of the capacitor and the following conditions are satisfied:

(a) the value of $R_1$ is greater than that of $R_2$;

(b) the value of $R_1.R_2.C_1$ is constant so as to determine said predetermined frequency characteristics of the amplifying circuit;

(c) the value of $R_1+R_2$ is selected on the basis of said DC saturation level of said amplifying circuit; and (d) the value of $R_2$ is selected on the basis of said output impedance of said amplifier;

(5) thereby a noise of the amplifying circuit is reduced but a gain of the amplifying circuit over a predetermined frequency band containing said predetermined frequency remains substantially unchanged as compared to a case where the values of $R_1$ and $R_2$ are equal.

12. The amplifying circuit according to claim 11, further comprising:

a third resistor connected in parallel with said series connection of said first and second resistors;

wherein $R_3$ is a resistance of said third resistor and the value of $R_1$ is greater than that of $R_2$ so as to reduce an increase factor of $(1+R_3/R_1)$ of the noise generating at an inversion input terminal of the operational amplifier due to amplification of a signal of said predetermined frequency band containing said predetermined frequency by the amplifying circuit under the predetermined gain of the amplifying circuit determined by a predetermined value of $R_3$ and under a predetermined DC elimination ratio of $(R_1+R_2)/R_3$ of the amplifying circuit.

13. The amplifying circuit according to claim 11, further comprising:

a third resistor connected in series with said capacitor;

wherein $R_4$ is a resistance of said third resistor and the value of $R_1$ is greater than that of $R_2$ so as to reduce an increase factor of $(1+R_2/R_4)$ of the noise voltage generated at an inversion input terminal of said operational amplifier due to amplification of a signal of said predetermined frequency band containing said predetermined frequency by the amplifying circuit under the predetermined gain of the amplifying circuit determined by a predetermined value of $$R_1 + R_2 + \frac{R_1 \cdot R_2}{R_4}$$

and under a predetermined DC elimination ratio of $$\frac{R_1 + R_2}{R_1 + R_2 + \frac{R_1 \cdot R_2}{R_4}}$$

of the amplifying circuit.

* * * * *